United States Patent [19]

Seidenberger

[11] 4,400,903
[45] Aug. 30, 1983

[54] METHOD AND APPARATUS FOR TRAPPING FLYING INSECTS EXHIBITING PHOTOTROPIC BEHAVIOR, PARTICULARLY GYPSY MOTHS

[75] Inventor: James W. Seidenberger, Royersford, Pa.

[73] Assignee: J. T. Baker Chemical Company, Phillipsburg, N.J.

[21] Appl. No.: 255,293

[22] Filed: Apr. 17, 1981

[51] Int. Cl.$^3$ .............................................. A01M 1/02
[52] U.S. Cl. ...................................................... 43/122
[58] Field of Search ................. 43/113, 118, 122, 131, 43/132; D22/19

[56] References Cited

U.S. PATENT DOCUMENTS

| D. 227,563 | 7/1973 | Torchia | D22/19 |
| 1,258,962 | 3/1918 | Taylor | 43/118 |
| 1,419,859 | 6/1922 | Keckler | 43/118 |
| 4,217,723 | 8/1980 | Hrebec | 43/122 |
| 4,244,135 | 1/1981 | Harwoods | 43/122 |

*Primary Examiner*—Nicholas P. Godici
*Assistant Examiner*—M. Jordan
*Attorney, Agent, or Firm*—George W. Rauchfuss, Jr.

[57] ABSTRACT

The present invention provides a trapping method and trap apparatus for flying insects exhibiting phototropic behavior, particularly gypsy moths. The trap is designed to utilize the insect's phototropic reaction both (a) to aid in inducing it to enter into an enclosure or trap and (b) to keep it inside away from the opening or openings for a sufficient time for a volatile insecticide within the trap to kill the insect. The trap includes a housing formed, in an upper part, from light-transmissive material with at least one opening defined in the housing below its light-transmissive portion. An insect is lured into the housing through the opening primarily by a female sex attractant, and also is lured by the illumination entering through the light-transmissive top, and once inside, is attracted upwardly towards the top of the housing and away from the opening by light entering through the light-transmissive top of the housing. The longitudinal axis of the housing is vertical, and the opening or openings in the housing are preferably facing upwardly (either vertically upwardly or upwardly at an angle) for each defining an insect entry path having a vertical or upward angular component relative to the longitudinal axis of the housing. A light-transmissive obstruction surface may be provided spaced above the opening(s), to further reduce the possibility of an insect escaping down and out through an opening before the insecticide has taken effect. The opaque sidewall of the housing plus an opaque shed-like shade rim over each opening serve to channel the transmitted light downwardly from the light-transmissive portion of the housing through each opening for enhancing the attractiveness to a phototropic flying insect of the upwardly directed opening.

24 Claims, 18 Drawing Figures

METHOD AND APPARATUS FOR TRAPPING FLYING INSECTS EXHIBITING PHOTOTROPIC BEHAVIOR, PARTICULARLY GYPSY MOTHS

BACKGROUND

Gypsy moths are now the most destructive defoliant of hardwood trees in the Northeastern United States. As reported in the New York Times on Oct. 19, 1980, gypsy moths defoliated a record 5.1 million acres from Maine to Maryland in 1980, causing fifteen times more destruction than in the previous year. Projections for 1981 are that the defoliation resulting from these insects will be worse.

Present methods for dealing with the gypsy moth problem are not effective to combat the epidemic. For example, aerial spraying of toxic insecticides will indiscriminately kill beneficial insects as well as the destructive gypsy moths. Furthermore, experts themselves are not even sure if aerial spraying would be effective against gypsy moths, as the aforementioned New York Times article has noted.

Figure 1:
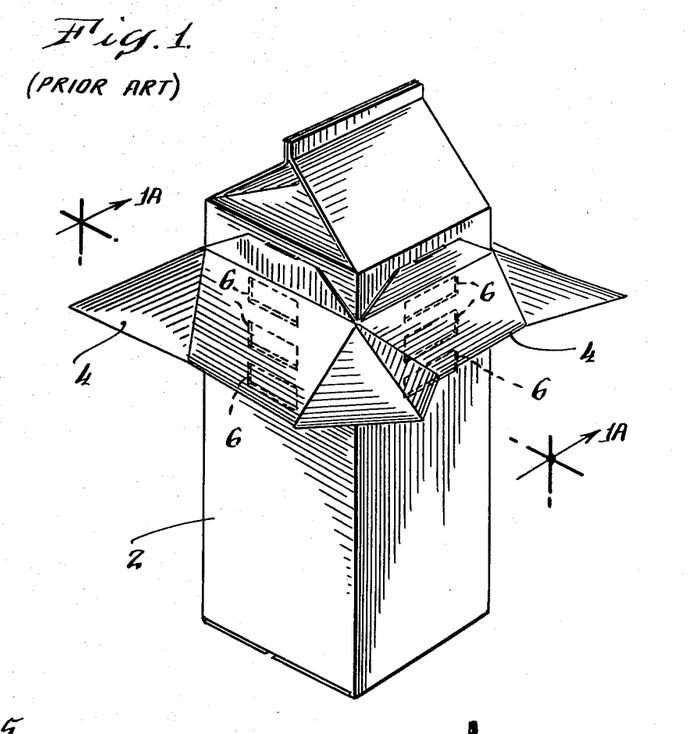
FIG. 1 of the drawings illustrates a known prior art "milk-carton" type gypsy moth trap.
Figures 1A, 5:
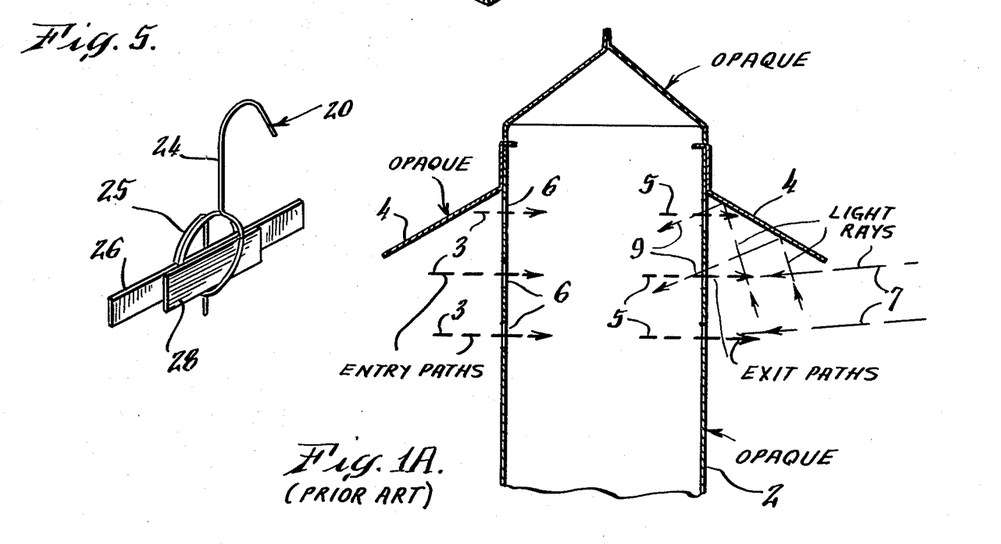
FIG. 1A is an elevational sectional view through the upper portion of the trap of FIG. 1 for illustrating certain disadvantages of this prior art trap.
FIG. 5 is a perspective view of a hook for suspending a gypsy moth trap including means on said hook for retaining strips of insecticide and attractant within the trap.

Known apparatus currently on the market for trapping gypsy moths as shown in FIGS. 1 and 1A are produced by both the USDA and also by Herculite Products, Inc. of New York. These traps are similarly formed from an opaque, milk-carton-shaped housing having window openings of slots defined in the vertical sidewalls of the housing, thus the flying insect entry path into the opaque, milk-carton housing is generally in the horizontal direction. As will be discussed and illustrated below, the "milk-carton" type traps have several distinct disadvantages when used as a gypsy moth trap.

It is an object of the present invention to provide an improved gypsy moth trap adapted to utilize the phototropic behavior of the gypsy moth both to induce it into an enclosure or trap containing a volatile insecticide and to keep the gypsy moth within the trap away from the openings for a sufficient time for the insecticide to take effect and kill the insect.

SUMMARY OF THE INVENTION

The present invention provides a trap for flying insects exhibiting phototropic behavior, particularly gypsy moths. The trap includes a housing having an upper portion thereof formed from a light-transmissive material. At least one opening is defined in the housing, preferably below the altitude of the light-transmissive portion. The opening or openings are directed or oriented upwardly (either angularly upwardly or vertically upwardly) relative to the vertical longitudinal axis of the housing. The housing may be indented to define a barrier surface spaced above the opening for further reducing the possibility of an insect escaping down and out of an opening. Means for suspending a strip of sex attractant and a strip of volatile insecticide are provided within the trap.

In operation, a gypsy moth is lured into the trap through the opening both by the odor of the sex attractant and by external light transmitted into the housing through the light-transmissive upper portion of the housing and channeled downwardly through the upwardly directed opening. The opaque sidewall of the housing plus an opaque shade rim located closely above each opening effectively channel the transmitted light downwardly from the illuminated upper part of the housing into each opening for enhancing the attractiveness to a phototropic flying insect of the upwardly directed opening. Once the moth is within the housing, it is attracted upwardly away from the opening towards the light entering the housing from the upper light-transmissive portion. As a result of the attraction of the moth to a position within the housing remote from the opening, the likelihood of a moth escaping through the opening is greatly diminished, and the moth is kept within the trap for a time sufficient for the volatile insecticide to take effect. The upwardly directed orientation of each opening relative to the longitudinal axis of the housing, and the barrier member spaced above the opening, further reduce the likelihood of escape.

DETAILED DISCUSSION

(A) DISCUSSION OF THE PRIOR ART

FIGS. 1 and 1A of the drawings illustrate a known gypsy moth trap referred to as the "milk-carton" design. This type trap is formed from an opaque milk-container-shaped housing, generally indicated by the reference numeral 2. A shade rim 4 is mounted around the periphery of the top of the housing by, for example, tabs extending inwardly from the rim which are received in complementary slots in the container. A plurality of windows or openings 6 are formed in the vertical sidewall of the housing, located below the shade rim 4. It is to be noted that these prior art openings 6 are oriented in the same plane as the vertical sidewall of the housing. A female moth sex attractant (not shown), that is, a pheromone (which is [+] disparlure) is usually suspended beneath shade rim 4 relatively near to the openings 6 to lure male gypsy moths through the openings and into the housing. A solid contact insecticide (not shown), preferably 2-(1-Methylethoxy)-phenol methylcarbomate, sold under the brand name Baygon, is provided in the housing on the bottom of the housing.

The above-described "milk-carton" gypsy moth trap has several inherent disadvantages. The relatively large windows or openings 6, which are positioned in vertical planes as viewed from within the housing, each provide a relatively large space through which moths within the housing may escape. Since these windows are positioned in vertical planes they each define a generally horizontal entry path 3, with a horizontal exit path 5 being located directly ahead of the respective entry path. Also, light external to the housing either enters the housing directly through the openings as shown by light rays 7 or is reflected into the housing by the lower surface of the shade rim 4, as shown by light ray 9. Such a light ray 9 is initially reflected upwardly toward the shade rim by a bright patch of ground, pavement or rock. Because of the phototropic behavior of the moths, external light entering the openings provides a stimulus for moths within the housing to fly out. Furthermore, the solid contact insecticide on the bottom of the housing will not kill the moth until it actually touches the insecticide. The result of the combination of the above disadvantageous aspects of the prior art trap increases the likelihood that a moth will escape from the trap before it is killed by contact with the solid insecticide.

The present invention provides a gypsy moth trapping method and trap designed to overcome the disadvantages of the known trap discussed above. As will be seen, the improved trap advantageously utilizes the insect's phototropic reaction both to induce the moth into the trap and keep it inside away from the openings after it has entered.

(B) DISCUSSION OF THE PREFERRED EMBODIMENTS

FIGS. 2A-2E illustrate a first embodiment of an improved gypsy moth trap in accordance with the present invention. A generally cylindrical housing with a vertical longitudinal axis is indicated by the reference numeral 8 and comprises a lower base portion 10 including a bowl 11 and an upper top portion 12 removably mountable on the base. The top 12 is formed, at least in part, from a light-transmissive material such as a clear plastic, for example, such as an acrylic. The base 10 is, however, formed from opaque material, such as polyvinyl chloride, or is coated with an opaque material for rendering the base non-light-transmissive. In the illustrated embodiment, the entire top 12 is light-transmissive.

Figures 2A, 2B, 2C:
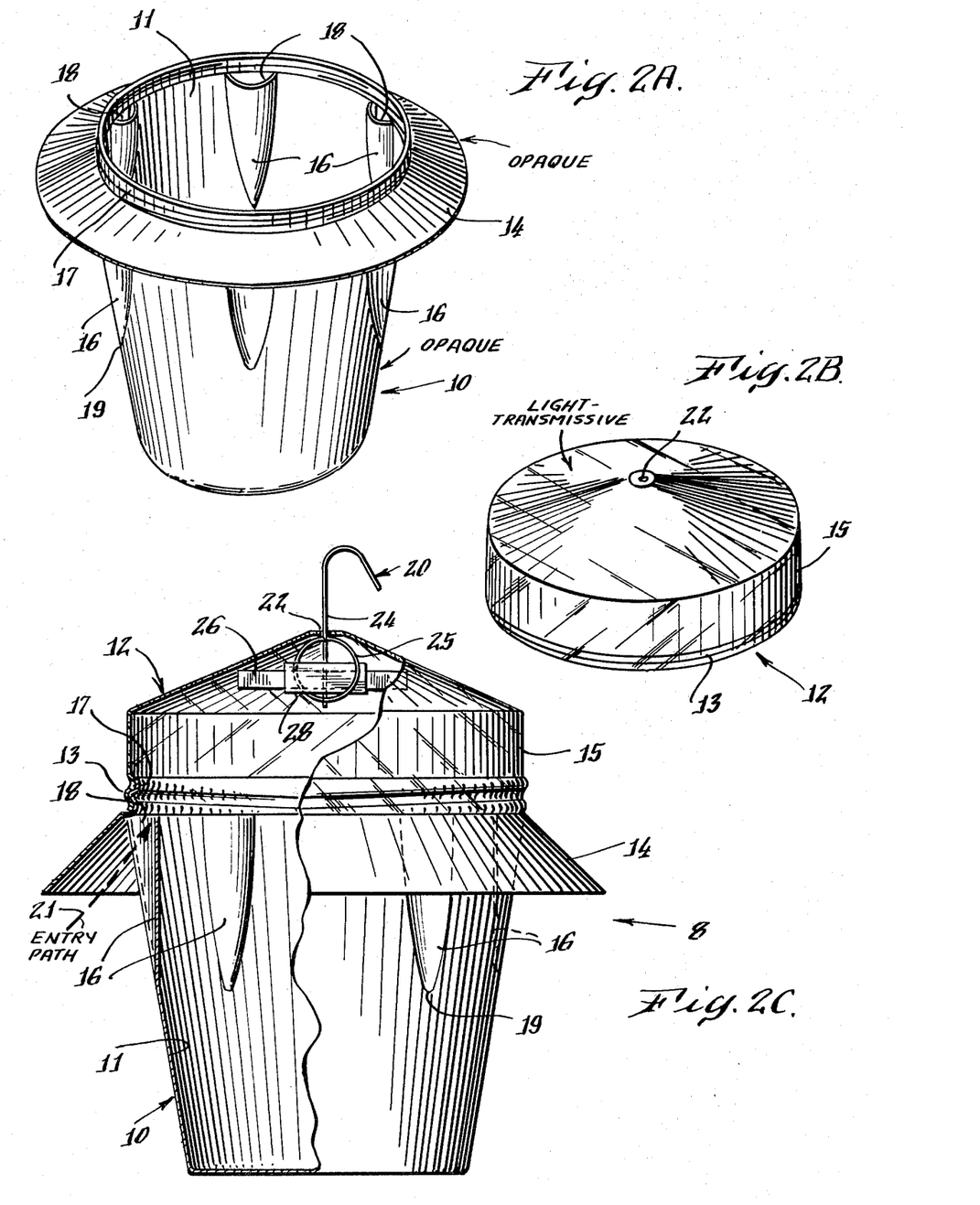
FIG. 2A illustrates, in perspective, the base of a first embodiment of a gypsy moth trap in accordance with the present invention.
FIG. 2B illustrates, in perspective, the light-transmissive top of the gypsy moth trap of FIG. 2A.
FIG. 2C is a side elevational view, partially in section, of the fully assembled gypsy moth trap, with the top shown in FIG. 2B mounted on the base shown in FIG. 2A.

Suitable demountable attachment means 13 are provided for removably attaching the cover 12 onto the base 10. For example, screw thread grooves or convolutions 13 are formed in the lower margin of the skirt 15 of the top 12 for engaging with complementary screw thread grooves or convolutions 17 formed in the upper margin of the sidewall of the base 10 for removably securing the top to the base. The top 12 can be formed from a flexible material to facilitate its mounting to and dismounting from the base.

An annular truncated conical shade rim 14 extends peripherally outwardly and downwardly from the outer surface of the base 10 immediately adjacent to the cover attachment means 17 at the upper end of the base. A plurality of longitudinally extending channel-like indentations or grooves 16 are formed in the sidewall of the base 10 beneath the location at which the shade rim is mounted to the base. These channel-like vertical grooves, which are shown as being equally spaced apart from each other around the periphery of the base, commence at regions 19 approximately half-way up the sidewall of the bowl 11 and extend upwardly towards its top. These channels 16 enlarge upwardly toward their upper ends. Although the drawings illustrate six equally spaced channels 16, the exact number of such channels or grooves is not critical.

Figure 2D:
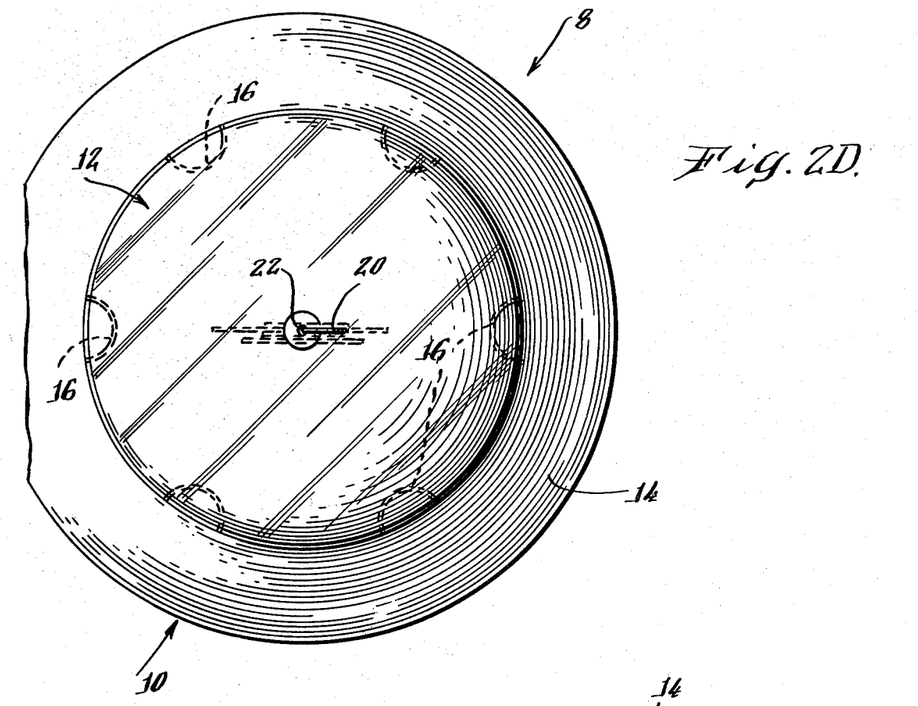
FIG. 2D is a top plan view of the gypsy moth trap shown in FIG. 2C.
Figure 2E:
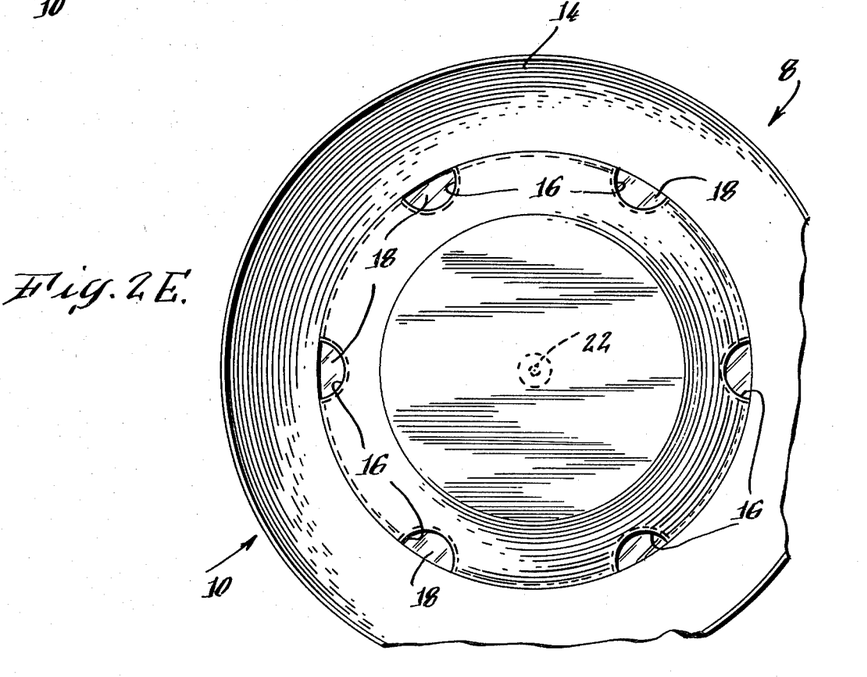
FIG. 2E is a bottom plan view of the gypsy moth trap shown in FIG. 2C.

As more clearly seen in FIGS. 2D and 2E, each of the channel grooves 16 terminates near the upper margin of the sidewall of the base 10 to define a semi-circular opening or entry port 18 located near the periphery of the upper portion of the base, near the level from which the shade rim 14 extends outwardly from the base. Thus, these entry ports 18 are also located near the attachment means 13, 17 where the light-transmissive top 12 is secured to the opaque base 10. The entry ports or openings 18 are formed in the plane which is substantially perpendicular to the longitudinal axis of the base 10. In other words, these openings 18 are directed upwardly, essentially vertically upwardly, so that the entry path 21 for the flying insect is inwardly (toward the axis of the trap) with a major component of travel directed upwardly toward the light-transmissive top 12.

As shown in FIG. 2C, when the light-transmissive top 12 is mounted to the base 10, the openings 18 in the base are approximately adjacent to the lower skirt portion 15 of the light-transmissive top 12. Thus, an insect entering the openings 18, as will be discussed below, is admitted into the housing proximate to the light-transmissive top 12.

A hook 20, as shown in detail in FIG. 5, has its shank 24 received through a central hole 22 in the crest of the conical upper portion of the top 12. This hook hole 22 is positioned on the longitudinal axis of the trap 8. Thus, the entire housing 8 may be suspended vertically from the hook 20 when the light-transmissive top 12 is assembled with the base 10. The lower end of the shank 24 is bent into a coiled spring holder 25 located within the light-transmissive top 12 when the housing is suspended from the hook 20. The coiled spring holder 25 is shown as having approximately two turns of large diameter so that it serves as a stop as seen in FIG. 2C for preventing the hole 22 from sliding off of the lower end of the shank 24. As will be discussed below, controlled release strips of a volatile insecticide and a female sex attractant conveniently can be removably inserted into the coiled wire holder within the transparent or translucent top 12.

In operation, the gypsy moth trap described with reference to FIGS. 2A-E is assembled by inserting the hook through the hole 22 and then mounting the light-transmissive top 12 on to the base 10 and suspending the now assembled trap 8 by the hook 20 extending upwardly from the top. A first, controlled-release strip 26 containing a volatile insecticide DDVP (which is phosphoric acid 2, 2-dichloroethenyl dimethyl ester), and a second, controlled-release strip 28 containing a female moth sex attractant pheromone ([+]disparlure), are removably secured by the wire holder 25 (please see also FIG. 5) on the shank 24 of the hook 20 within the top of the trap 8. Controlled-release devices such as strips 26 and 28 are generally known to the art, and reference is made to U.S. Pat. No. 3,864,468 for further information. The advantage of using such controlled-release devices (26 and 28) is that they provide the most efficient means for metered dispensing of small amounts of expensive insect pheromones. They optimize and control the lengevity of the product's chemical systems and also assure minimal human contact with the chemical agents. Additionally, the physical design of the devices provide a convenient means for removal and replacement of such systems whenever necessary or desired.

Air currents flowing through the openings 18 of the suspended housing carry the female sex attractant. Detection of the attractant by male moths induces them to enter the housing through the openings 18. The peripheral shade rim 14 extending downwardly and outwardly from a level very near to the level of the entry ports or openings 18 tends to guide the entering moths upwardly (as shown by arrow 21) into the openings. The upwardly enlarging channel 16 associated with each opening also tends to guide the entering moth upwardly into the respective opening.

As discussed above, the top 12 of the trap is formed from a light-transmissive material and the openings 18 are oriented in a plane substantially perpendicular to the longitudinal axis of the trap. By virtue of this advantageous relationship, a gypsy moth near the outside of an opening 18 will observe external light (such as sunlight) transmitted downwardly through the top 12 and channeled downwardly through the openings 18. Because of the phototropic behavior of gypsy monnths, these beams of external light channeled through the openings 18 serve further to induce the moth into entering 21 the trap through the opening. The truncated conical shade rim 14, in addition to guiding the moth into the openings 18, as noted above, tends to block from the view of the moth any confusing external sources of light other than those top-transmitted beams being channeled downwardly through the openings 18.

Once the moth is induced to pass through an opening 18, it enters the housing proximate to where the light-transmissive top 12 is mounted to the opaque base 10. As a result of external light entering the trap through the light-transmissive top, the moth is attracted towards the top, and away from the openings 18, because of the moth's phototropic behavior. As a result of the presence of both the sex attractant and external light entering the trap, the moth is induced to remain in the trap, away from the openings 18, for a sufficient time for the volatile insecticide within the trap to overcome the moth. This time period is generally in the order of between one-half to one hour from the time of initial entry.

The substantially vertical orientation of the direction of entry into openings 18 relative to the longitudinal axis of the trap reduces the likelihood that a moth might randomly escape through those openings after it has entered the trap. Also, as discussed above, the vertical orientation of the openings permits substantially only external light from above the trap to be channeled through the openings to induce a moth to enter and remain in the trap. Unlike the prior art trap with its horizontal direction of entry into the openings, the upwardly facing orientation of the openings of the present embodiment tends to prevent the entry of external light into the housing other than the light entering from the light-transmissive top 12 and thereby, does not provide an inducement for escape of the moths through the openings.

Once a moth in the trap is overcome by the volatile insecticide, it drops to the bottom of the base. The interior of the bowl 11 of the trap may be visually inspected through the light-transmissive top 12. The trap may be periodically disassembled and reassembled by removing the top 12 from the base 10 for the purpose of removing dead moths from the base bowl or for replacing the controlled-release strips 26 and 28.

A second embodiment of a gypsy moth trap in accordance with the present invention is illustrated in FIGS. 3A-3E. This embodiment is similar to that discussed with reference to FIGS. 2A-2E, and accordingly, corresponding elements of the two embodiments have been designated with the same reference numerals.

Figures 3A, 3B, 3C:
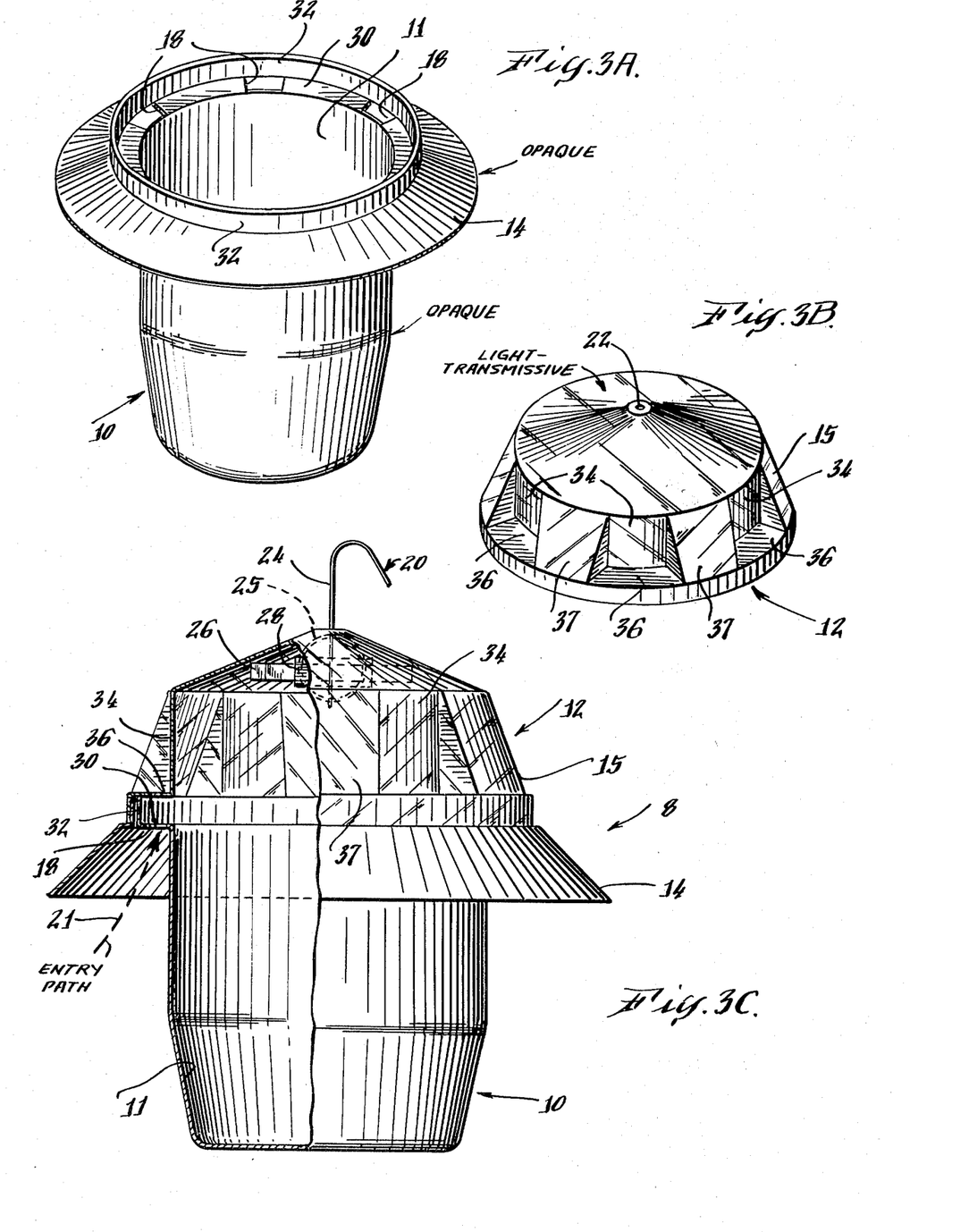
FIG. 3A illustrates, in perspective, the base of a second embodiment of a gypsy moth trap in accordance with the present invention.
FIG. 3B illustrates, in perspective, the light-transmissive top of the gypsy moth trap of FIG. 3A.
FIG. 3C is a side elevational view, partially in section, of the fully assembled gypsy moth trap, with the top shown in FIG. 3B mounted on the base shown in FIG. 3A.
Figure 3D:
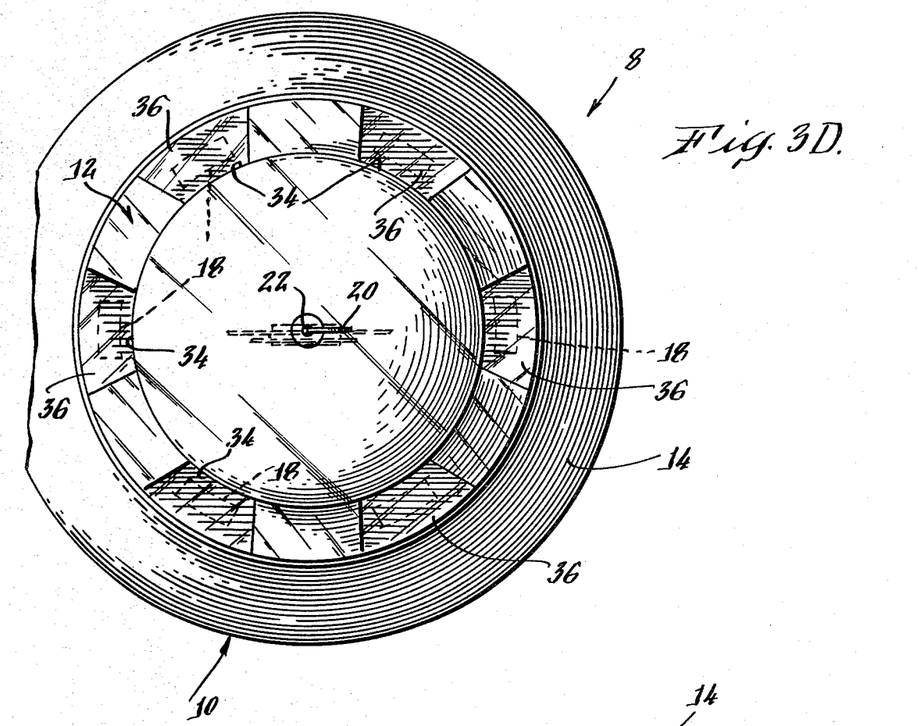
FIG. 3D is a top plan view of the gypsy moth trap shown in FIG. 3C.
Figure 3E:
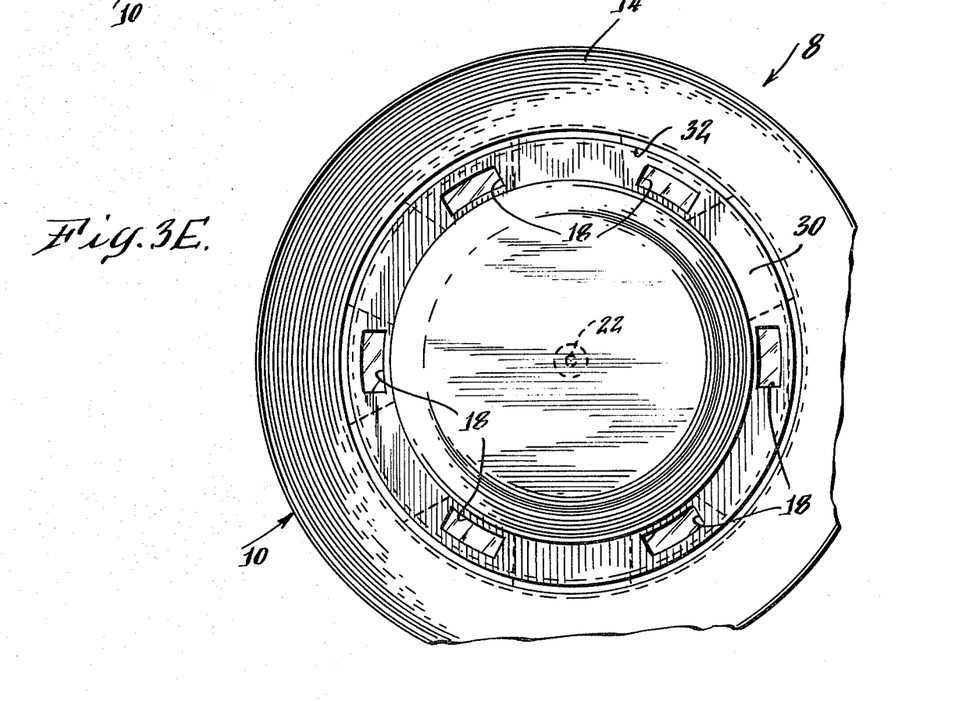
FIG. 3E is a bottom plan view of the gypsy moth trap shown in FIG. 3C.

The major structural differences between the present embodiment and that illustrated in FIGS. 2A-2E is that in the present embodiment, the openings 18 are formed in a horizontal flange or shelf-like annular portion 30 extending peripherally around the upper portion of the generally cylindrical base 10. The truncated conical shade rim 14 extends from this flange 30, being attached to this flange by an intervening vertical annular lip 32. This annular lip 32 is provided by forming the opaque sheet material of the base into a narrow inverted u-shape extending around the perimeter of the flange 30, as seen in FIG. 3C. The light-transmissive top 12 has the lower margin of its skirt 15 snugly mounted around the outer surface of the lip 32 so that a moth entering the openings 18 is enclosed within the trap of housing 8. The shelf-like flange 30 extends horizontally outwardly from a level near the upper end of the base 10 in a plane perpendicular to the longitudinal axis of the housing 8. Accordingly, each of the openings 18 faces upwardly and defines an entry path 21 oriented vertically relative to the housing, similar to the upwardly directed entry path 21 as illustrated in FIG. 2C.

Additionally, a plurality of step-like indentations, shown generally by the reference numeral 34, are formed in the skirt portion 15 of the light-transmissive top 12. Each of these indentations defines an inwardly directed planar member or internal obstruction ridge 36. The number and spacing of the indentations 34 and the internal ridges 36 formed in the top 12 correspond in number and spaing to the openings 18 defined in the base 10. Further, the indentations and internal ridges are formed towards the lower portion of the skirt 15 of the top 12. Thus, the top, when mounted to the base 10, can be adjusted so that the respective ridges 36 are in axial alignment with, but spaced above, the openings 18 to form a vertical gap therebetween, as seen in FIG. 3C.

These indentations 34 also serve as finger grip holds for convenience in screwing the top into the base. The vertical gap between each ridge 36 and its associated opening is equal to the height of the annular lip 32.

The basic principles of operation of this trap of FIGS. 3A-3E are generally the same as those discussed with respect to the trap of FIG. 2A-2E. However, the present embodiment has the added advantage that the step-like internal ridges 36 spaced above and aligned with the respective openings 18 provide an overhead obstruction to further diminish the likelihood that a moth entrapped within the housing might randomly escape down through an openings 18. Although in the preferred embodiment of the invention the obstruction is defined integrally with the top 12 to reduce manufacturing costs, it is still within the scope of the invention to provide separable obstruction means attachable to the top 12.

Advantageously, these internal step-like ridges 36 are light-transmissive for aiding in luring the phototropic moths along the upwardly directed entry path 21. The sloping portions 37 of the skirt 15 of the top 12 are located between the step-like indentations 34, and these sloping portions 37 define internal channels within the top which aid in allowing the odor or the attractant 26 to circulate down near to the openings 18 and out through these openings.

The embodiment of the trap illustrated in FIGS. 4A-4E is similar to the trap shown in FIGS. 3A-3E, and accordingly, corresponding elements are designated by the same reference numerals. The basic principles of operation of the present embodiment are identical to those of the trap of FIGS. 3A-3E. The primary structural difference between the present embodiment and that illustrated in FIGS. 3A-3E is the inclined flange portion 30' as compared with the horizontal shelf-like flange portion 30 and the annular vertical lip 32. This truncated conical flange 30' slopes upwardly and outwardly at an acute angle relative to the longitudinal axis of the trap. Accordingly, the openings 18 which are located in this inclined surface 30' face upwardly and inwardly relative to the longitudinal axis of the trap 8. In the illustrated embodiment, this flange 30' slopes at an angle of approximately 60° to a plane perpendicular to the longitudinal axis of the trap. In other words, this flange 30' slopes at approximately 60° relative to the horizon. Therefore, the openings 18 face upwardly and inwardly at an angle of approximately 30° relative to the horizon so that the entry path through each opening is directed upwardly at approximately 30° to the horizon for ease of an insect in flying up and in through an opening.

Figures 4A, 4B, 4C:
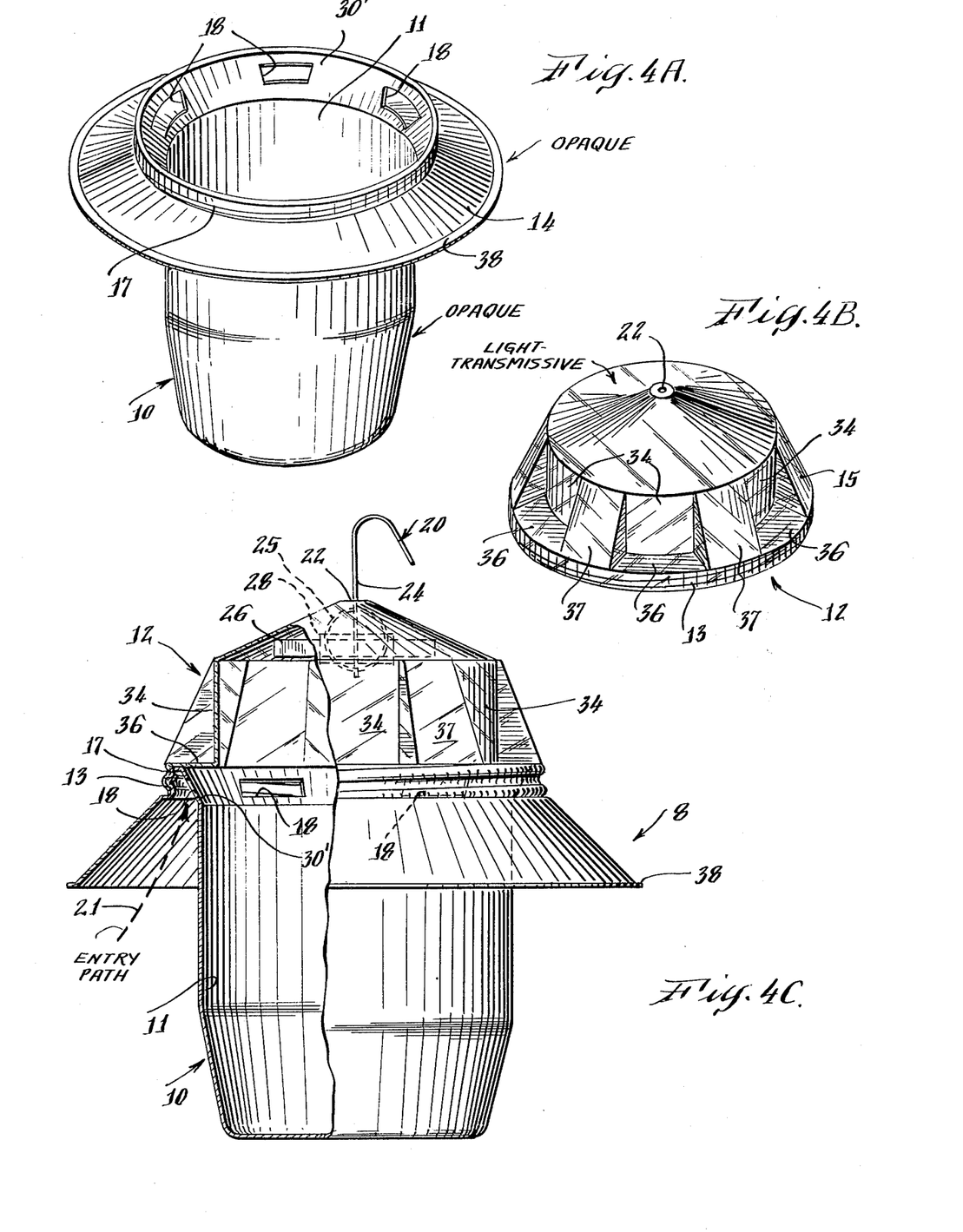
FIG. 4A shows, in perspective, the base of a third embodiment of a gypsy moth trap in accordance with the present invention.
FIG. 4B shows, in perspective, the light-transmissive top of the gypsy moth trap of FIG. 4A.
FIG. 4C is a side elevational view, partially in section, of the fully assembled gypsy moth trap, with the top shown in FIG. 4B mounted on the base shown in FIG. 4A.
Figure 4D:
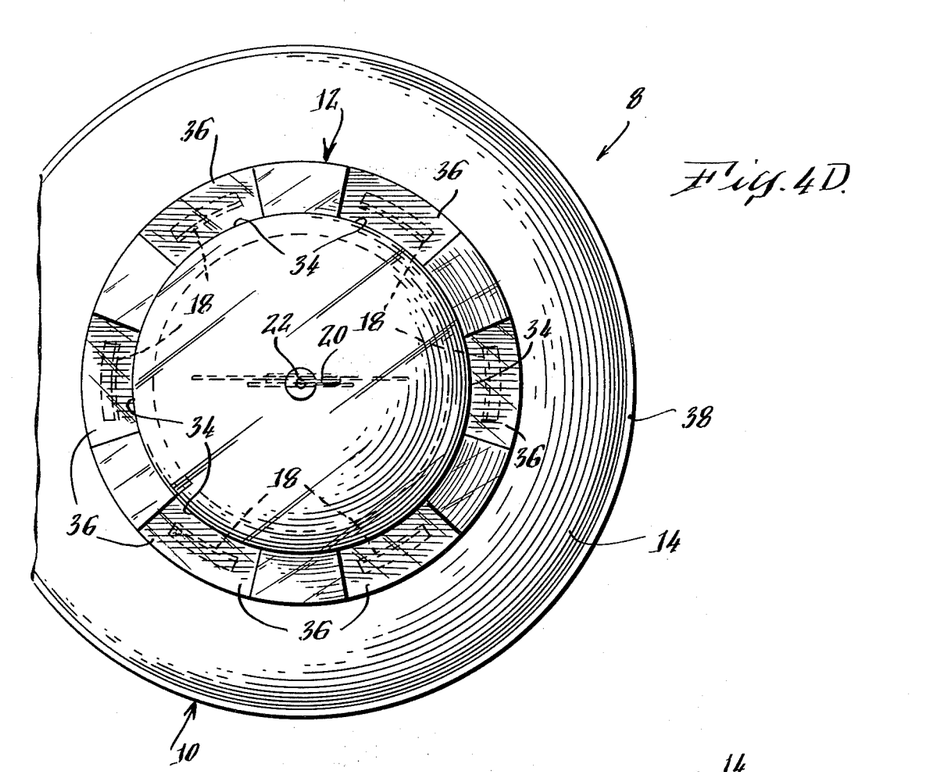
FIG. 4D is a top plan view of the gypsy moth trap shown in FIG. 4C.
Figure 4E:
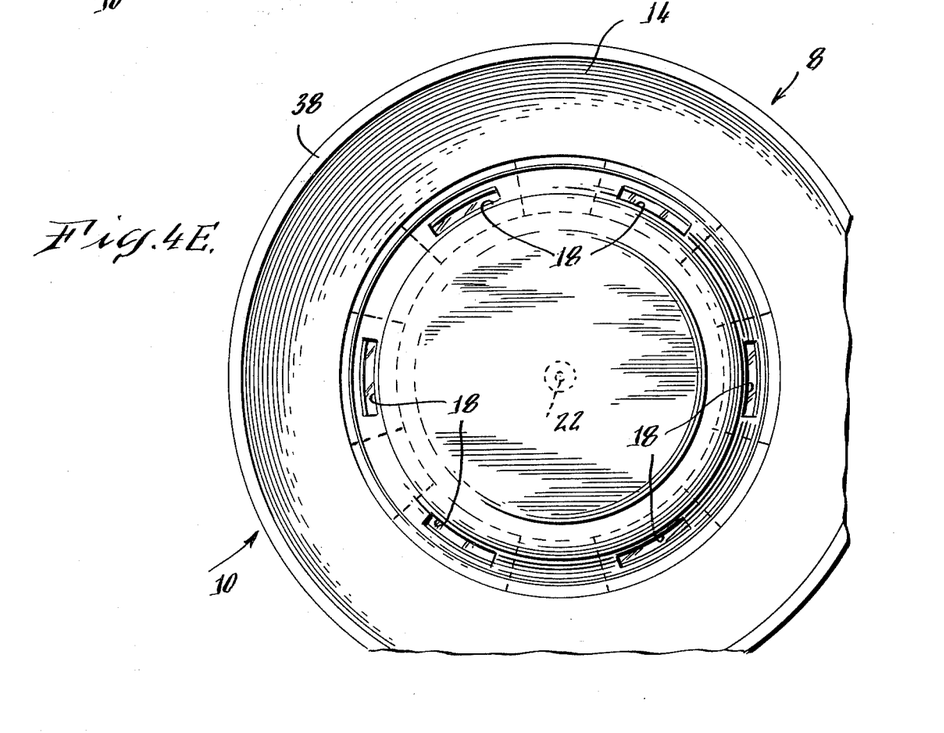
FIG. 4E is a bottom plan view of the gypsy moth trap shown in FIG. 4C.

The screw thread groove convolutions 17 of the base are located in an annular region which extends down from the top of the sloping flange 30'. Then, the truncated conical shade rim 14 extends downwardly and outwardly from below the threaded region 17. The lower margin of the skirt 15 of the light-transmissive top 12 has threaded convolutions 13 for screwing into the threaded region 17 of the base. When assembled, the light-transmissive step-like obstructions 36 are spaced above the respective inclined openings 18. The top may be conveniently screwed on to or off from the base 10 when assembling or disassembling the trap.

It is to be noted that the truncated conical shade 14 slopes downwardly and outwardly at an angle of approximately 45° to horizontal. In the embodiment of FIGS. 4A-4E, there is a horizontal flange 38 extending around the perimeter of this shade 14 for stiffening it. This flange 38 is approximately ⅛th to 3/16ths of an inch wide.

In these three traps 8 the lower edge of the shade 14 is at a level at least ⅜ths of an inch below the bottom edge of the openings 18. Thus, in effect, the shade 14 completely overlaps and shields the windows 18 and even extends down to a level considerably below the level of the bottom of these windows. Contrary to this advantageous complete shading relationship, the shade rim 4 of the prior art (FIGS. 1 and 2) terminates at a level above some of the windows 6.

In the prior art traps the openings 6 are oriented in vertical planes, i.e., in planes which are parallel with the length of the trap (in planes oriented at a zero angle relative to the length of the trap). In marked distinction, the openings 18 in the traps 8 are located in planes which are oriented at an angle relative to the longitudinal axis of the trap, i.e., the planes of the openings 18 are oriented at an acute angle or at right angle to the longitudinal axis of the trap.

In these three traps 8 the shade rim 14 plus the attachment region 17 or 32 where the top is attached to the base plus the flange portion 30 or 30' are advantageously formed or molded from a thicker, stiffer guage of weather resistant plastic material. Then, in order to conserve on material, the bowl portion 11 of the base is formed or molded from a thinner and less stiff guage of weather resistant plastic material suitably secured to the flange 30 or 30', for example by cementing or thermal bonding.

The entire opaque base 10 including the bowl and the shade rim 14 may be colored an attractive dark forest green. The top 12 may be transparent or translucent in order to provide light-transmissive capability. I prefer a transparent top, because it more nearly simulates a sky region for attracting a trapped phototropic insect upwardly, and the transparent top enables the user to glance down into the bowl 11 to determine whether a sufficiently large number of dead moths have been collected to require emptying.

All three of these traps 8 are eminently well suited to perform their intended functions, and they all are preferred embodiments. At the present moment I believe that the embodiment of FIGS. 4A-4E is optimum.

It is to be understood that the embodiments of the invention described above are intended to be illustrative only, and not restrictive of the scope of the intention. For example, although the trap or housing 8 is illustrated as comprising a separable base and top, a unitary housing may be provided instead. Furthermore, although the embodiments as illustrated contain six opening 18, the invention could be embodied in a trap with a single opening, or with a lesser or greater number than six. Other modifications and variations within the scope of the invention will be understood to those skilled in the art. Accordingly, the scope of the present invention is defined only by the terms of the following claims and all equivalents thereto.

I claim:

1. A trap for catching flying insects exhibiting phototropic behavior, said trap comprising:
    an enclosure having a plurality of openings therein facing upwardly for defining upwardly directed entry paths through the openings into the enclosure for said flying insects, and
    at least a portion of said enclosure above said openings formed from light-transmissive material, said enclosure includes a plurality of inwardly directed ridges which are positioned in substantial axial alignment with, and spaced apart from and above said openings for forming gaps between said ridges and said openings within said enclosure, whereby said ridges provide obstructions tending to prevent the random escape through said openings of flying insects entrapped within said enclosure, means are provided within the enclosure for holding an odor-releasing attractant within said enclosure above the level of said inwardly directed ridges, the regions of said enclosure between said inwardly directed ridges serve as channels for conveying the odor from said attractant downwardly near to said openings, whereby flying insects entering said enclosure through said openings are attracted upwardly away from said openings by external light passing downward through said light-transmissive portion of said enclosure.

2. A trap according to claim 1 in which:
said enclosure has the openings therein facing vertically upwardly for defining entry paths through the openings directed generally vertically upwardly into the enclosure.

3. A trap according to claim 1 in which:
said enclosure has the openings therein facing upwardly at an acute angle relative to a horizontal plane for defining entry paths inclined upwardly inwardly through the openings toward the interior of the enclosure.

4. A trap according to claim 1, 2 or 3 in which:
there are means provided for holding controlled release strips of an odor-releasing attractant and a volatile insecticide within the enclosure closely below said light-transmissive portion for causing the phototropic behavior of a flying insect to aid in luring the flying insect up within the enclosure near to the location of said volatile insecticide.

5. A trap according to claim 1, 2 or 3 in which:
the enclosure includes a sidewall with a peripheral flange extending outwardly from an upper portion of the sidewall, and
said openings are located in said peripheral flange.

6. A trap according to claim 2, in which:
the enclosure includes a sidewall with a peripheral flange extending horizontally outwardly from an upper portion of the sidewall; and
said openings facing vertically upwardly are located in said horizontal flange.

7. A trap according to claim 3 in which:
the enclosure includes a sidewall with a sloping peripheral flange extending upwardly outwardly from an upper portion of the sidewall at an acute angle relative to a horizontal plane, and
said openings are formed in said sloping flange.

8. A trap according claim 1, 2, 3, 6, or 7 in which:
said enclosure comprises a lower base and an upper top removably mountable to said base, and
at least a portion of said top is formed from said light-transmissive material.

9. A trap according to claim 8 in which:
said top in its entirety is formed from said light-transmissive material.

10. A trap according to claim 9, including:
means within said light-transmissive top of the enclosure for suspending a controlled release source of volatile insecticide within said top for causing the light passing into the enclosure through said top or lure the trapped flying insect up into the top near to said source of insecticide.

11. A trap according to claim 1, 2, 3, 6 or 7 in which:
said light-transmissive portion of said enclosure is located above said openings at a position toward which the entry paths through the openings are directed for causing the phototropic behavior of a flying insect to aid is luring the flying insect upwardly through the openings into the enclosure.

12. A trap according to claim 11 in which:
an outwardly and downwardly extending peripheral shade is mounted to said enclosure at a location thereon closely above said openings for aiding in channeling light from said light-transmissive portion downwardly along the entry paths.

13. A trap according to claim 12, in which:
said ridges are located above said openings for providing overhead obstructions and are light-transmissive for aiding in luring a flying insect up through the openings into the enclosure.

14. A trap according to claim 1 in which:
the material of said enclosure in which said ridges are made is light-transmissive for aiding in luring a flying insect up through an opening into the enclosure.

15. A trap according to claim 14 in which:
each of said ridges includes a horizontal planar area of light-transmissive material spaced above the openings.

16. A trap for catching flying insects exhibiting phototropic behavior, said trap comprising:
a housing formed from a separable base and top,
said top of said housing being formed from light-transmissive material,
said base of said housing being opaque, means for removably securing said base and top together,
at least one opening being defined in said base in a plane that intersects the longitudinal axis of said base at an angle,
said opening provides an upwardly directed entry path for flying insects entering the trap through said opening and said entry path is directed upwardly toward said light-transmissive top for causing external light passing through said top into said trap to aid in luring the phototropic flying insects up through said opening into the trap,
at least one indentation is formed in said light-transmissive top for providing an inwardly directed ridge-like surface in said top,
said top is mountable on said base with said ridge-like surface being in alignment with and spaced above said opening, and
whereby said insects are attracted into said housing through said opening and are attracted away from said opening after entering said housing by light transmitted into the housing through said light-transmissive top.

17. A trap according to claim 16 in which there are a plurality of openings and a plurality of indentations with ridge-like sufaces.

18. A trap according to claim 17 in which said base has a plurality of openings facing vertically upwardly for defining entry paths through the openings directed generally vertically upwardly into the housing.

19. A trap according to claim 17 in which said base has a plurality of openings facing upwardly at an acute angle relative to the horizontal plane for defining entry paths inclined upwardly inwardly through the openings toward the interior of the housing.

20. A trap according to claim 17 in which there are provided means for holding controlled release strips of an odor releasing attractant and a volatile insecticide within the housing closely below said light transmissive portion for causing the phototropic behavior of a flying insect to aid in luring the flying insect up within the housing near to the location of the volatile insecticide.

21. A trap according to claim 20 in which the base includes a sidewall with a peripheral flange extending outwardly from an upper portion of the sidewall and said openings are located in said peripheral flange.

22. A trap according to claim 20 in which the base includes a sidewall with a sloping peripheral flange extending upwardly outwardly from an upper portion of the sidewall at an acute angle relative to a horizontal plane and said openings are formed in said sloping flange.

23. A trap according to claim 22 in which an outwardly and downwardly extending peripheral shade is mounted to said housing at a location thereon closely above said openings for aiding in channeling light from said light-transmissive top downwardly along the entry paths.

24. A trap according to claim 23 in which: each of said ridge-like surfaces includes a horizontal planar area of light-transmissive material spaced above the openings.

* * * * *